United States Patent [19]

Greene et al.

[11] Patent Number: 4,744,132

[45] Date of Patent: May 17, 1988

[54] LOCK RING ASSEMBLY AND DISASSEMBLY METHOD

[75] Inventors: George O. Greene, Glenpool; Jimmy G. Foster; Jim Hein, both of Tulsa, all of Okla.

[73] Assignee: Unit Rig & Equipment Company, Tulsa, Okla.

[21] Appl. No.: 928,834

[22] Filed: Nov. 10, 1986

[51] Int. Cl.[4] .............................................. B23P 19/00

[52] U.S. Cl. .................................... 29/426.6; 29/453; 29/229; 29/235; 29/261

[58] Field of Search .................................. 29/225-229, 29/235, 258-262, 267-268, 426.5, 426.6, 451, 453; 81/9.3, 424.5, 426.5; 152/410; 411/517, 521, 530

[56] References Cited

U.S. PATENT DOCUMENTS

| | | | |
|---|---|---|---|
| 1,217,686 | 2/1917 | Barnett | 29/229 |
| 2,166,089 | 7/1939 | Brenner | 29/268 |
| 2,180,271 | 11/1939 | Arras | 29/229 |
| 2,933,970 | 4/1960 | Pagano | 411/520 |
| 4,068,365 | 1/1978 | Brandt et al. | 29/261 |
| 4,581,481 | 4/1986 | Moretti | 29/268 |

*Primary Examiner*—Robert C. Watson

*Attorney, Agent, or Firm*—Head & Johnson

[57] ABSTRACT

An improved lock ring and spreader tool affording a method of removing the lock ring from a circumferential groove on a rim, the lock ring serving to retain a tire flange in position on the rim, the lock ring being split with juxtaposed ends each having a slot therein, the bottom of the slots being of concave configuration, and a spreader tool having opposed jaws, the jaws being receivable in the slots in the lock ring and the jaws having convex surfaces thereon, the spreader tool jaws being moveable apart so that the tool when inserted in the slots in the lock ring, serves to force the ends thereof apart, expanding the diameter of the lock ring and permitting its expeditious removal from the circumferential groove.

2 Claims, 4 Drawing Sheets

46
12
48
28
44
32
54
36
50
30
14
18
20
16
10
22
18

LOCK RING ASSEMBLY AND DISASSEMBLY METHOD

SUMMARY OF THE INVENTION

With large off-road type vehicles a typical means of mounting a tire on a rim includes the use of a removeable rim flange. The flange has an internal diameter slightly larger than the external diameter of the outer portion of a rim. To mount a tire it is first put on the rim and then the flange is inserted into position. Thereafter, the tire is inflated. A means must be provided for retaining the flange on the rim. A common expedient for doing this includes the use of a lock ring. For this purpose, the rim has a circumferential recess therein which receives the lock ring. The lock ring is typically retained in position by the flange as the flange is forced outwardly upon the inflation of the tire.

For more background information relating to rims for large off road vehicles including a lock ring, reference may be had to co-pending United States patent application Ser. No. 851,096 entitled "IMPROVED RIM FOR HEAVY OFF ROAD VEHICLES" and to the following previously issued U.S. Pat. Nos. 3,129,034; 2,660,476; 3,468,584; 2,270,918; Re. 27,220; 2,521,260; 4,021,077; 3,421,797; and 2,261,637.

While the use of a lock ring received in a recess on a rim works exceedingly well to retain a flange in position, one problem is that of removing the lock ring from within the recess so as to permit the removal of the flange.

The present invention provides a means of readily expanding the diameter of a lock ring so that it can be expeditiously and safely removed from or installed onto a rim. For this purpose a spreader tool is employed in combination with a lock ring of a particular construction. Spreader tools per se are known implements and for reference to other type spreader tools, reference may be had to the following U.S. Pat. Nos. 832,170; 897,841; 1,214,315; 1,450,965; 1,473,075; 1,531,771; 1,534,066; 1,543,862; 1,694,893; 2,153,941; 2,376,721; and 2,643,565.

In the present invention the lock ring is split providing juxtaposed ends. Each of the ends has a slot therein with paralleled sidewalls. The plane of the slots are coincident. The bottom surface of each of the slots is provided with a concave semi-circular configuration.

A spreader tool is employed having opposed jaws which can be moved apart from each other. Each of the jaws is of a thickness to be readily received within the slots in the lock ring and the jaws have opposed convex surfaces. The convex surfaces on the spreader tool jaws are semi-circular and preferably of a diameter substantially the same as the diameter of the semi-circular concave bottom surface of the lock ring slots.

To remove a lock ring from a rim the jaws of the spreader tool are positioned adjacent to or contiguous to each other and the jaws are inserted in the slots of the lock ring. The jaws are spread apart by actuation of the tool, expanding the diameter of the lock ring. As the juxtaposed ends of the lock ring are spread apart from each other, the jaws of the spreader tool pivot within the concave surfaces of the lock ring slots. When the diameter of the lock ring has been increased sufficient to exceed the external diameter of the rim, the lock ring can be easily removed from the rim, the spreader tool remaining engaged with the lock ring during the removal process.

To reinstall the lock ring in the circumferential recess of a rim the process is repeated. The spreader tool and lock ring are moved as a unit with the jaws spread apart until the lock ring is slid over the end of a rim and in position to be received within the rim circumferential recess. The spreader tool is then operated to move the jaws toward each other allowing the lock ring to contract in diameter and move into the circumferential groove, after which, with the jaws of the spreader tool adjacent each other, the spreader tool can be removed from engagement with the lock ring.

For a better understanding of the invention reference may be had to the following description and claims, taken in conjunction with the attached drawing.

DESCRIPTION OF THE PREFERRED EMBODIMENT

Figure 1:
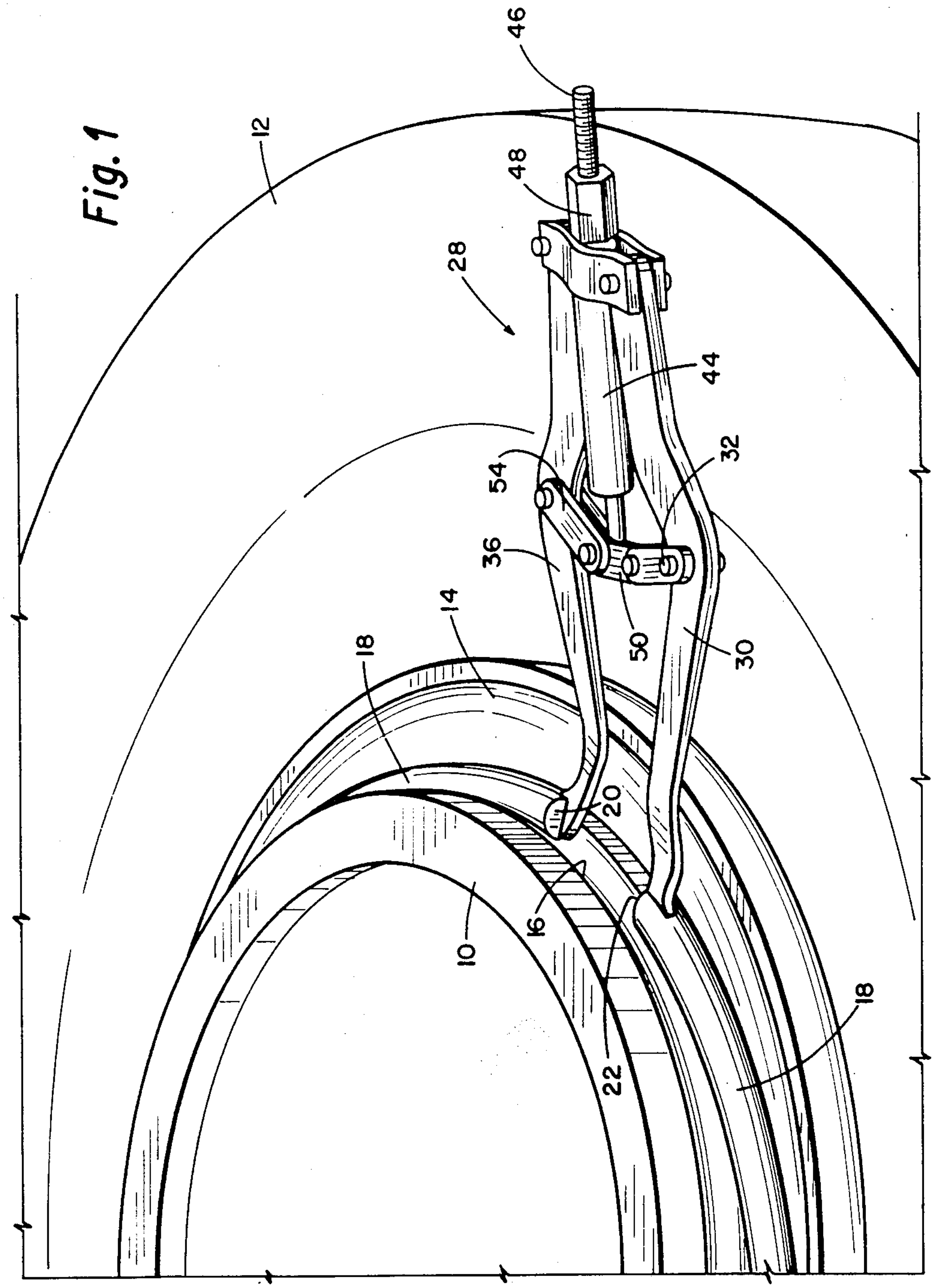
FIG. 1 is an isometric view of a rim for a large off road vehicle having a tire and tire retaining flange thereon, the rim having a circumferential groove which receives a lock ring of the present invention and showing a spreader tool as used in removing the lock ring from position on the rim.

Referring to the drawings and first to FIG. 1, the rim 10 of a large diameter wheel, such as may be employed on an off road vehicle, is shown. The opposite end of the rim 10 which is not seen in the drawing typically has a flange which receives one circumferential bead of a pneumatic tire 12. To retain the tire 12 in position on rim 10 a second, removeable flange 14 is employed. The internal diameter of flange 14 is slightly larger than the external diameter of rim 10 in the area of the outer portion of the rim as shown so that the flange 14 may be slid onto and off of the rim.

A problem with such large rims is that of retaining the removeable flange 14 is position. For this purpose, a known technique is to provide a circumferential recess 16 in the rim. The circumferential recess may be semicircular in cross-sectional configuration and receives a lock ring 18, typically of circular cross-sectional configuration. The lock ring 18 is split, providing two ends 20 and 22. The lock ring is dimensioned so that the ends 20 and 22 are spaced close to each other when the lock ring is fully seated in the circumferential recess 16.

When in such fully seated position within the recess, flange 14 is prevented from moving off of the rim 10 and in the preferred arrangement the flange is also configured so that as it is pushed outwardly when tire 12 is inflated, the lock ring is prevented from being inadvertently dislodged from recess 16.

For more information relating to the construction of rim 10, flange 14 and lock ring 18, reference may be had to copending application No. 851,096 entitled "IMPROVED RIM FOR HEAVY OFF-ROAD VEHICLES" filed Apr. 14, 1986.

A problem which has existed with the rim having a flange 14, circumferential recess 16 and lock ring 18 as hereto described is that of installing the lock ring into groove 16 and, more particularly, removing it from the groove. In large diameter wheels, which may be in the magnitude of three or four feet in diameter, the lock ring 18 may be of a cross-sectional diameter of one-half inch or greater and is formed of steel, so that dislodging the lock ring from the recess 16 is difficult. In fact, in the preferred arrangement of the invention the parts are specifically constructed so that such a dislodgement is difficult to thereby guard against the inadvertent displacement of the lock ring. Nevertheless, when it is necessary to change tire 12, workmen must remove the lock ring 18 and this, in the past, has been a difficult job.

Figure 6:
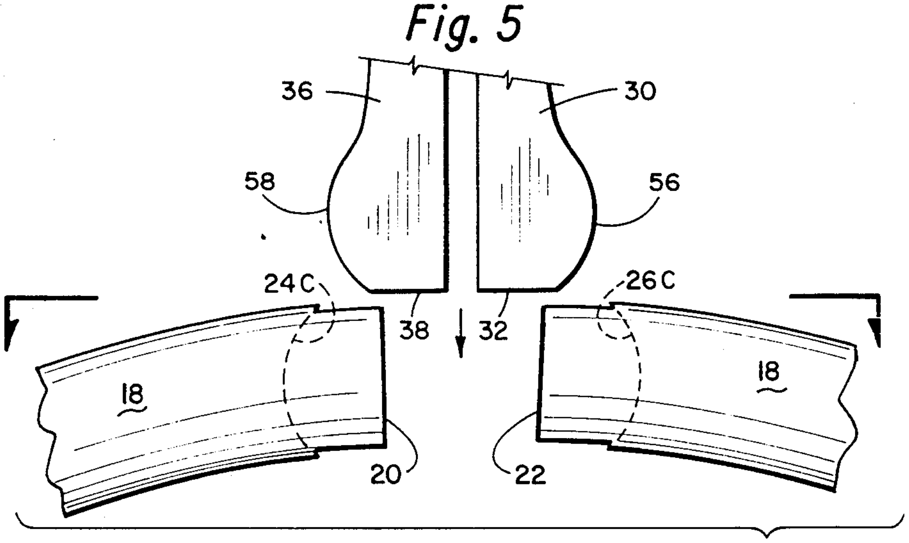
FIG. 6 shows a side view of the end portions of the lock ring as in FIG. 5 and showing the jaw portions of a spreader tool in position to be inserted into engagement with the lock ring.
Figure 7:
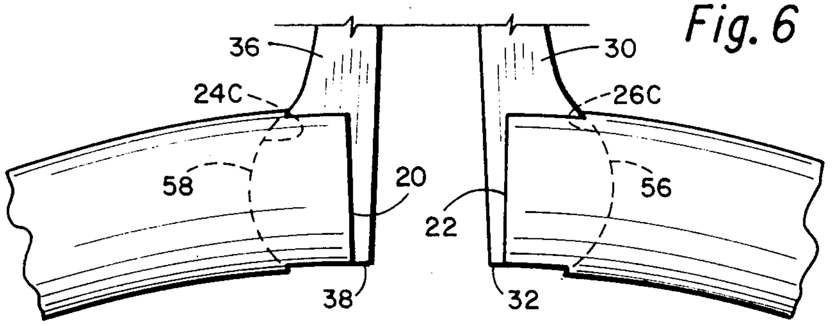
FIG. 7 shows the spreader tool jaws in engagement with the end portions of the lock ring.
Figure 8:
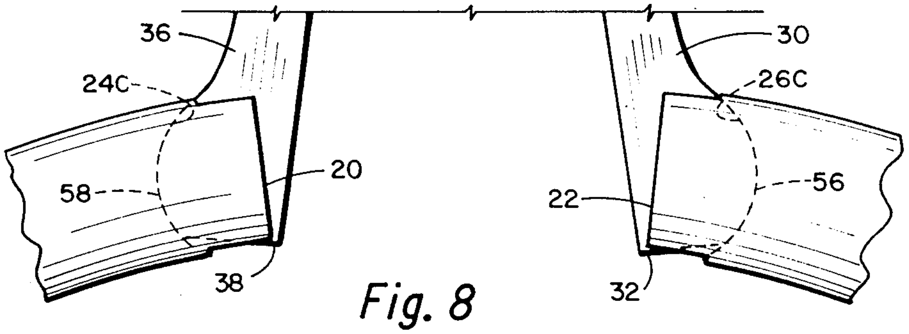
FIG. 8 shows the jaw portions of the spreader tool in engagement with the end portions of a lock ring and showing the jaws forced apart to increase the diameter of the lock ring.

The present invention provides a means of solving this problem. First, the lock ring 18 is specifically configured as best shown in FIGS. 5 through 8. Formed in first end 20 is a slot 24 having parallel side walls 24A and 24B. The bottom of slot 24, identified by the numeral 24C, is concave and preferably of semi-circular configuration as shown in FIGS. 6, 7 and 8.

The opposite end 22 of the lock ring has a corresponding slot 26 with paralleled side walls 26A and 26B and a concave, preferably semi-circular slot bottom surface 26C. The slots 24 and 26 are in a common plane.

Figure 3:
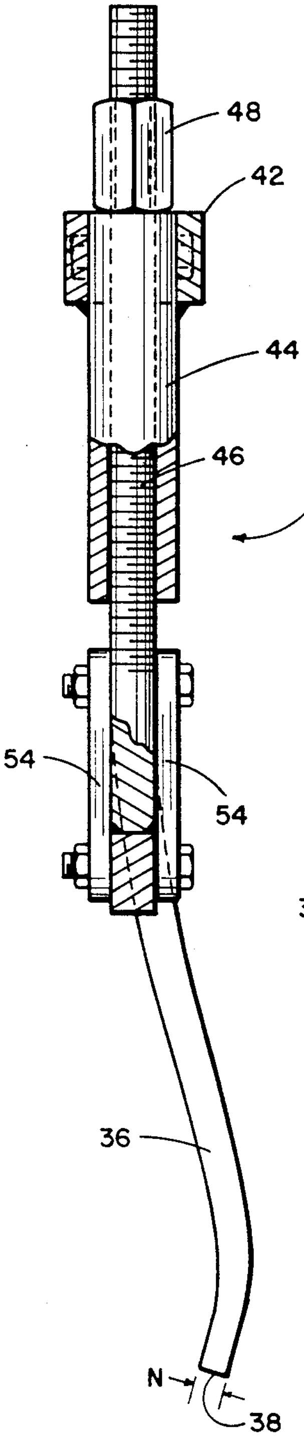
FIG. 3 is a cross-sectional view taken along the line 3—3 of FIG. 2 showing more details of the spreader tool.
Figure 2:
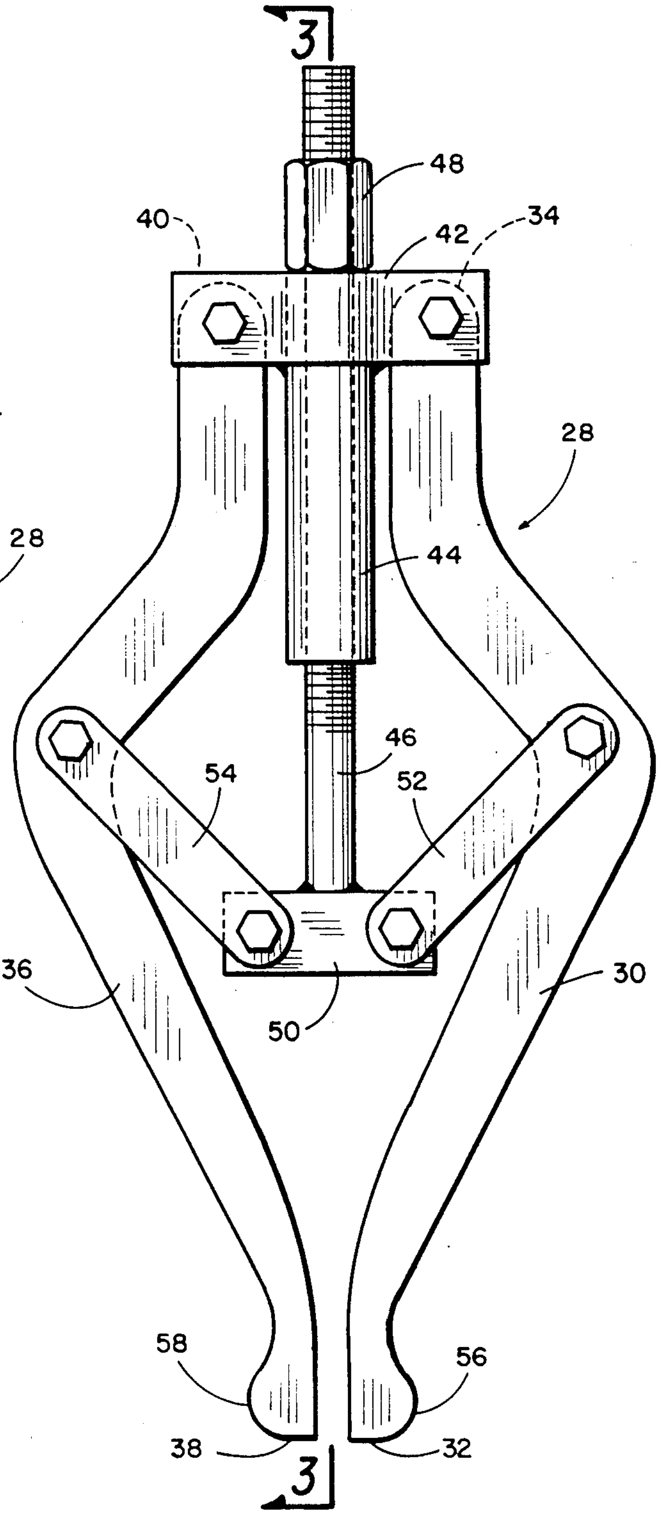
FIG. 2 is a plan view of a spreader tool as employed in this invention.
Figure 4:
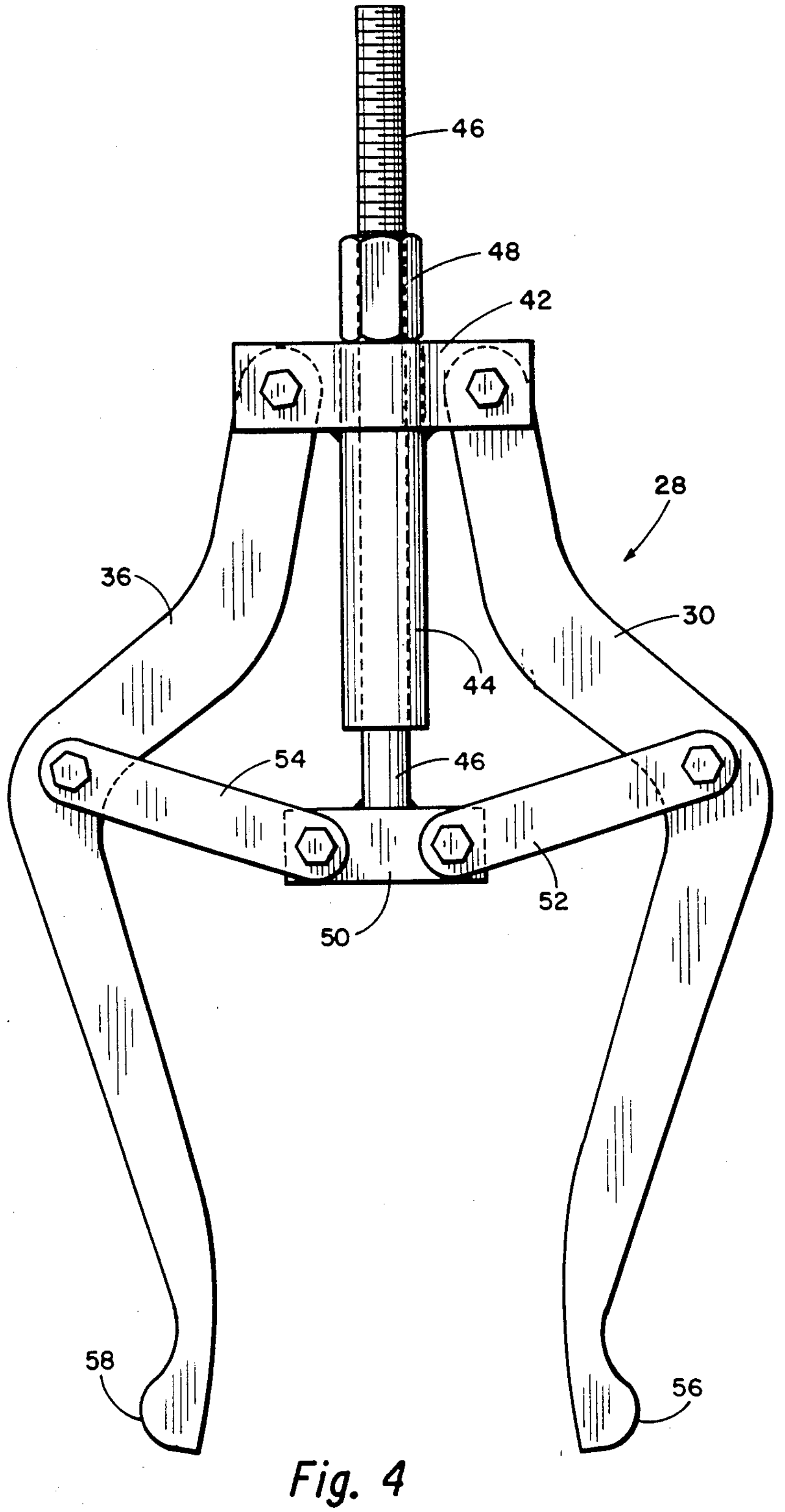
FIG. 4 is a view of the spreader tool as in FIG. 2 but showing the tool in the attitude wherein the jaws are spread apart.
Figure 5:
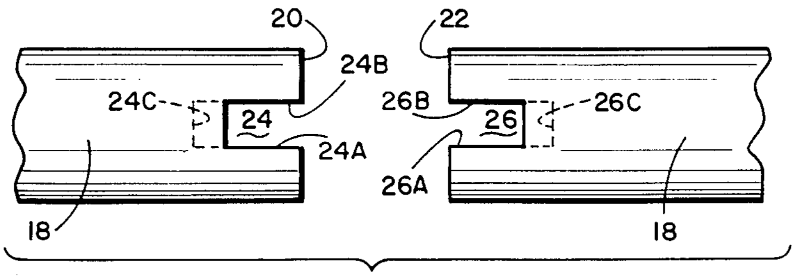
FIG. 5 shows the two juxtaposed end portions of the lock ring as employed in the invention.

For use with the lock ring having the end configurations as shown in FIGS. 5 through 8 is a spreader tool 28, best seen in FIGS. 2, 3 and 4. The spreader tool has a first elongated jaw piece 30 having a forward end 32 and a rearward end 34, a corresponding second jaw piece 36 having a forward end 38, and a rearward end 40. The jaw piece rearward ends 34 and 40 are pivoted relative to each other such as from a bracket 42. Means is provided for moving the jaw piece forward end portions 32 and 38 towards and away from each other. This may be accomplished in a variety of ways, but in the illustrated arrangement a tubular member 44 is secured to the bracket 42 and receives a bolt 46 having a nut 48 thereon in engagement with one end of the tubular member 44. At the inner end of bolt 46 is a bracket 50 which pivotally receives the ends of two pairs of linkages 52 and 54, the opposite ends of the linkages being pivoted to the jaw pieces 30 and 36. When nut 48 is rotated to withdraw bolt 46, the jaw pieces 30 and 38 expand apart from each other as shown in FIG. 4.

The configuration of the forward end portions of jaw pieces 30 and 36 is important to the invention. The forward end portions are generally flat as shown in FIG. 3 and of a width W which is less than the spacing between the paralleled side walls of slots 24 and 26 of the lock ring. This permits the end portions 32 and 38 to be positioned into slots 24 and 26.

Further, the outer surface 56 of the end portion 32 is convex, and preferably semi-circular, and preferably of the same semi-circular diameter as the slot bottom surfaces 24C and 26C of the lock ring. The end portion 38 of the second jaw piece 36 has a similar configured convex semi-circular outer surface 58.

When the lock ring is in position within circumferential recess 16 on a rim 10, it is necessary, in order to conveniently remove the lock ring, that its diameter be expanded so that the internal diameter thereof becomes greater than the external diameter of rim 10. This is accomplished in the practice of the invention by the process shown in FIGS. 6, 7 and 8. The end portions 32 and 38 of the spreader tool jaw pieces 30 and 36 are positioned adjacent, or if necessary, contiguous to each other, such as shown in FIG. 6 and positioned in the slots 24 and 26 in the lock ring 18. When in such slots the spreader tool jaw pieces 30 and 36 may be spread apart by rotating nut 48. As the jaw pieces are spread apart, the end portions 32 and 38 force the ends 20 and 22 of the lock ring apart, as shown in FIG. 8, increasing the internal diameter of the ring so that the ring is of an internal diameter greater than the external diameter of rim 10. In such condition the lock ring may be easily removed from recess 16 and from the rim itself.

As the jaw pieces of the expander tool 28 spread apart, the external convex outer surfaces 56 and 58 rotate against concave bottom surfaces 24C and 26C of the lock ring. In this manner, as the jaw pieces are moved further and further apart force is applied to the ends of the lock ring to spread it apart and at the same time, such force tends to hold the jaw piece end portions 32 and 38 in retention with the lock ring—preventing the expander tool from being inadvertently separated or slipping from the lock ring.

When it is necessary to install a lock ring onto rim 10 the process is reversed. That is, the expander tool is used to expand the internal diameter of the lock ring. The lock ring with the expander tool secured thereto is positioned on the rim and over the recess 16. Nut 48, which can be rotated manually or with an electrical or pneumatic wrench, causing the jaw piece 30 and 36 to move towards each other, seating the lock ring in the recess. When the lock ring is fully seated the jaw end portions 32 and 38 are juxtaposed, or if necessary, contiguous to each other and in such position the lock ring is dimensioned so that the spacing between the opposed concave surface 56 and 58 is less than the spacing between the slot bottom surface 24C and 26C, thereby allowing the expander tool to be freely withdrawn.

The invention provides an unique and safe means to remove a lock ring from or insert it onto a rim in which, during the insertion and removal process, the lock ring and expander tool function as a unit.

The claims and the specification describe the invention and the terms that are employed in the following claims draw their meaning from the use of such terms in the specification. The same terms employed in the prior art may be broader in meaning than specifically employed herein. Whenever there is a question between the broader definition of such a term used in the prior art and the more specific use of the term herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. With a wheel rim having a removeable tire receiving flange thereon, the rim having a circumferential recess therein and a split lock ring having juxtaposed ends, the lock ring being removeably positionable in said recess providing means, when the lock ring is in place in the recess, of retaining the flange on the rim and when the lock ring is removed from said recess of permitting the flange to be removed from the rim, a method of permitting the safe and convenient removal of the lock ring from the rim circumferential recess, comprising:

providing slots in each of said ends of said lock ring, the slots being in a common plane, the bottom of each slot being concave;

positioning the forward end portions of an expansion tool simultaneously into the slots in the lock ring, the forward end portions having convex surfaces which matingly engage the concave bottom surfaces of the lock ring slots;

forcing the forward ends of the expansion tool apart, the convex portions thereof pivoting in the lock ring concave notch bottom surfaces to expand the diameter of the lock ring; and removing the expanded lock ring from the rim circumferential recess while the tool retains the lock ring in an expanded diameter condition.

2. With a lock ring positionable in a circumferential recess, the lock ring having juxtaposed ends, a method of permitting the safe and convenient expansion of the lock ring to permit insertion into or removal from the recess, comprising:

providing slots in each of said ends of said lock ring, the slots being in a common plane of the lock ring and the side walls of each slot being parallel to each other, the bottom of each slot being concave;

positioning the forward end portions of an expansion tool simultaneously into the slots in the lock ring, each forward end portion having a width less than the spacing between the lock ring slot side walls and having a convex surface which matingly engage the concave bottom surface of lock ring slots;

forcing the forward ends of the expansion tool apart; the convex portions thereof pivoting in the lock ring concave notch bottom surfaces to expand the diameter of the lock ring; and removing the expanded lock ring from the circumferential recess or inserting the expanded lock ring into the circumferential recess while the tool retains the lock ring in an expanded diameter condition.

* * * * *